United States Patent
Deterre

(10) Patent No.: US 10,458,550 B2
(45) Date of Patent: Oct. 29, 2019

(54) REDUCTION IN THE LEAKAGE FLOW RATE OF A BRUSH SEAL BY FLEXIBLE GEOMETRIC OBSTRUCTION

(71) Applicant: SAFRAN AIRCRAFT ENGINES, Paris (FR)

(72) Inventor: Geoffray Deterre, Mormant (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 166 days.

(21) Appl. No.: 15/121,688

(22) PCT Filed: Feb. 26, 2015

(86) PCT No.: PCT/FR2015/050455
§ 371 (c)(1),
(2) Date: Aug. 25, 2016

(87) PCT Pub. No.: WO2015/128584
PCT Pub. Date: Sep. 3, 2015

(65) Prior Publication Data
US 2016/0363224 A1    Dec. 15, 2016

(30) Foreign Application Priority Data
Feb. 28, 2014  (FR) ................... 14 51633

(51) Int. Cl.
*F16J 15/32*     (2016.01)
*F16J 15/3288*   (2016.01)
(Continued)

(52) U.S. Cl.
CPC ......... *F16J 15/3288* (2013.01); *F01D 11/001* (2013.01); *F01D 11/003* (2013.01);
(Continued)

(58) Field of Classification Search
CPC .................................................. F16J 15/3268
See application file for complete search history.

(56) References Cited

U.S. PATENT DOCUMENTS

| 4,042,248 A | * | 8/1977 | Williamitis | F16J 15/3228 277/555 |
| 5,420,469 A | * | 5/1995 | Schmidt | F02B 63/04 123/198 E |

(Continued)

FOREIGN PATENT DOCUMENTS

| EP | 1 696 155 A2 | 8/2006 |
| EP | 2 009 333 A1 | 12/2008 |
| WO | 2008/127244 A1 | 10/2008 |

OTHER PUBLICATIONS

International Search Report dated Jun. 16, 2015 in PCT/FR15/050455 Filed Feb. 26, 2015.
(Continued)

*Primary Examiner* — Kristina R Fulton
*Assistant Examiner* — L. Susmitha Koneru
(74) *Attorney, Agent, or Firm* — Oblon, McClelland, Maier & Neustadt, L.L.P.

(57) ABSTRACT

A brush seal system, for application as an air/oil seal in a turbomachine shaft bearing, of axis of rotation, with the seal including a layer of carbon bristles, held between a first ring disposed upstream of a flow of air that passes through the seal, and a second ring disposed downstream of the flow of air, with a surface of the layer of bristles, which is turned towards the first ring, including a non-metal flexible element that makes it possible to stop a portion of flow of air that flows through the seal in a direction substantially parallel to the axis of rotation.

10 Claims, 5 Drawing Sheets

(51) Int. Cl.
  *F01D 11/00* (2006.01)
  *F01D 25/16* (2006.01)
  *F16C 33/78* (2006.01)

(52) U.S. Cl.
  CPC .......... *F01D 25/16* (2013.01); *F16C 33/7816* (2013.01); *F05D 2220/323* (2013.01); *F05D 2240/56* (2013.01); *F05D 2240/60* (2013.01); *F05D 2300/43* (2013.01)

(56) References Cited

U.S. PATENT DOCUMENTS

| | | | | |
|---|---|---|---|---|
| 6,318,728 B1* | 11/2001 | Addis | ................ | F01D 11/001 |
| | | | | 277/355 |
| 6,779,799 B2* | 8/2004 | Tong | ................ | F16J 15/061 |
| | | | | 277/355 |
| 7,066,468 B2* | 6/2006 | Uehara | ................ | F16J 15/3292 |
| | | | | 277/355 |
| 2005/0040602 A1* | 2/2005 | Beichl | ................ | F16J 15/3288 |
| | | | | 277/355 |
| 2006/0192343 A1 | 8/2006 | Hashiba et al. | | |
| 2008/0224415 A1* | 9/2008 | Flaherty | ................ | E06B 7/2316 |
| | | | | 277/355 |
| 2008/0284107 A1* | 11/2008 | Flaherty | ................ | C04B 35/10 |
| | | | | 277/355 |
| 2009/0001668 A1* | 1/2009 | Plona | ................ | F01D 11/001 |
| | | | | 277/355 |
| 2011/0049810 A1* | 3/2011 | Ferryman | ................ | F16J 15/3288 |
| | | | | 277/355 |
| 2012/0288361 A1* | 11/2012 | Lu | ................ | F01D 11/001 |
| | | | | 415/174.2 |

OTHER PUBLICATIONS

French Search Report dated Oct. 16, 2014 in French Application 14 51633 Filed Feb. 28, 2014.

\* cited by examiner

REDUCTION IN THE LEAKAGE FLOW RATE OF A BRUSH SEAL BY FLEXIBLE GEOMETRIC OBSTRUCTION

TECHNICAL FIELD AND PRIOR ART

The invention relates to the field of brush seals, used in turbomachines, in particular land or aeronautical turbomachines, for example those of aircraft such as turbojets or turboprops.

As shown in FIG. 1, a rotating shaft bearing 2 of a turbomachine, which rotates around a longitudinal axis XX', is generally constituted of a bearing 4 formed by an inner ring 5 connected to the shaft, of an outer ring 6 connected to a fixed portion (not shown on the figure) and bearing elements 10 disposed between said rings. This bearing is contained in a first enclosure 12 of which the function is to contain the oil used to lubricate the bearing.

A second enclosure 14 surrounds the first enclosure 12 and has for function to guarantee the dynamic seal at the interface between the enclosure and the shaft. The pressure $P_e$ of the air outside of this second enclosure is greater than $P_i$ inside this same second enclosure.

Each enclosure has a system 12a, 12b, 14a, 14b of seals intended to ensure the seal thereof.

It is known to create the dynamic seal by strips mounted on the shaft facing an abradable material integral with the fixed portion. However, for reasons of space and performance (leakage flow rate), the solution consisting in integrating a device of strips in contact with an abradable material cannot be applied in all of the applications.

Moreover, it is known to use brush seals, in particular metal brush seals, such as described in document WO2008/127244. Indeed, from a performance point of view, a metal brush seal is higher than a device of strips in contact with an abradable material.

A metal seal must not be in contact with the oil, because it allows it to pass through quickly. It can therefore be integrated into the air/oil enclosure, but at the price of modifications of integration. Indeed a metal seal requires mechanical devices downstream in the air/oil enclosure in order to prevent the projections of oils onto said seal. These devices, such as protective shields or chicanes, reduce the interest of a metal seal in terms of size.

A new constitution is therefore sought for a seal intended for an enclosure of a rotating shaft bearing.

It is also sought to improve the performance of a brush seal in a very compact environment, in particular in the context of an enclosure of a rotating shaft bearing of a turbomachine.

DISCLOSURE OF THE INVENTION

The invention first relates to a brush seal system, for example for application as an air/oil seal in a turbomachine shaft bearing, with the seal comprising a layer of carbon bristles, held between a first ring, referred to as the front ring, disposed upstream of a flow of air that passes through the seal, and a second ring, referred to as the rear ring, disposed downstream of said flow of air, with the surface of layer of bristles, which is turned towards the front ring, being provided with a non-metal flexible element that makes it possible to stop a portion of said flow of air that flows through the seal, for example in a direction substantially parallel to an axis of rotation of the shaft.

The first ring is intended to be disposed upstream of a flow of air that passes through the seal, and the second ring, referred to as the rear ring, downstream of this same flow of air.

In the case of an application as an air/oil seal of a shaft bearing of a turbomachine, a portion of the bristles of the seal, on the rear ring side, is intended to be in contact with an oil for lubricating said bearing.

According to the invention, the flexible part or element makes it possible to stop the portion of the flow of air that would be directed, otherwise, towards the central portion of the layer of bristles, according to the direction of longitudinal extension of the latter. It makes it possible to limit this flow to the lower portion of the end of this layer, i.e. to the portion of the latter that is disposed on the side of its free portion, intended to be in contact with a rotating surface. The air therefore passes, mainly, only in this end portion of the layer. The flexibility of the flexible element allows the latter and the layer to be deformed under the effect of the flow of air.

Preferably, said flexible element is in the form of a crown made of plastic material, for example of the Kapton® or PTFE type.

The flexible element can have a thickness between 0.05 mm and 0.5 mm.

It can for example leave free, subjected to the flow of air, an end portion of the layer, of a length, measured in the direction of extension of the bristles of the layer, between 0.1 mm and 2 mm.

An envelope can make it possible to hold an end of the bristles of the seal, opposite that intended to come into contact with a surface in rotation.

According to a particular embodiment, at least one ring makes it possible to hold an end of the bristles of the seal, opposite that intended to come into contact with said surface in rotation.

According to an embodiment, a ring, internal to the envelope, makes it possible to allow the front ring and the rear ring to pass. One end of the bristles of the seal can be in the form of a ring and be surrounded around a core of substantially circular section.

A seal system according to the invention a more preferably a circular configuration, in relation to the axis of rotation of the shaft.

The invention also relates to an enclosure of a shaft bearing of a turbomachine comprising a seal system according to the invention.

It also relates to a turbomachine comprising such a shaft bearing enclosure.

DETAILED DISCLOSURE OF PARTICULAR EMBODIMENTS

Figure 2A:
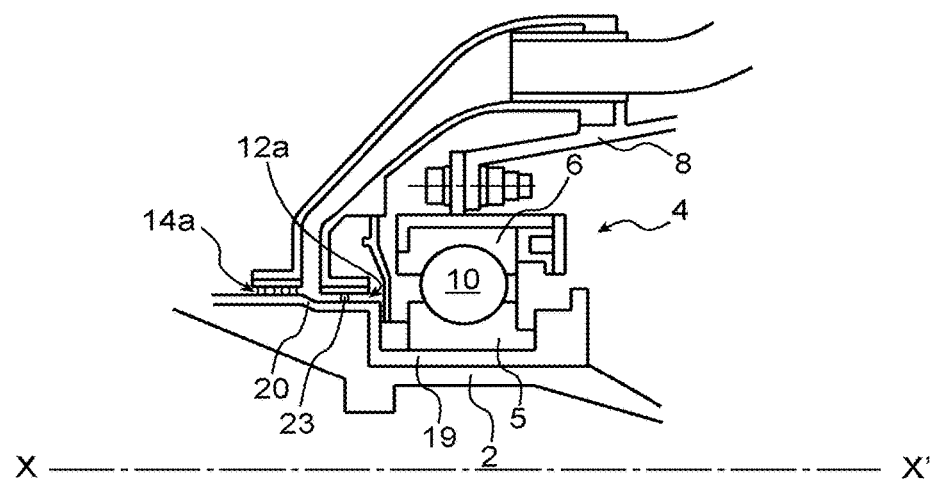
FIG. 2A shows an embodiment of a configuration of a bearing enclosure.

FIG. 2A shows a partial diagram of a bearing enclosure (such as can be found in engines of the "CFM"® type to which the invention can be applied).

Figure 1:
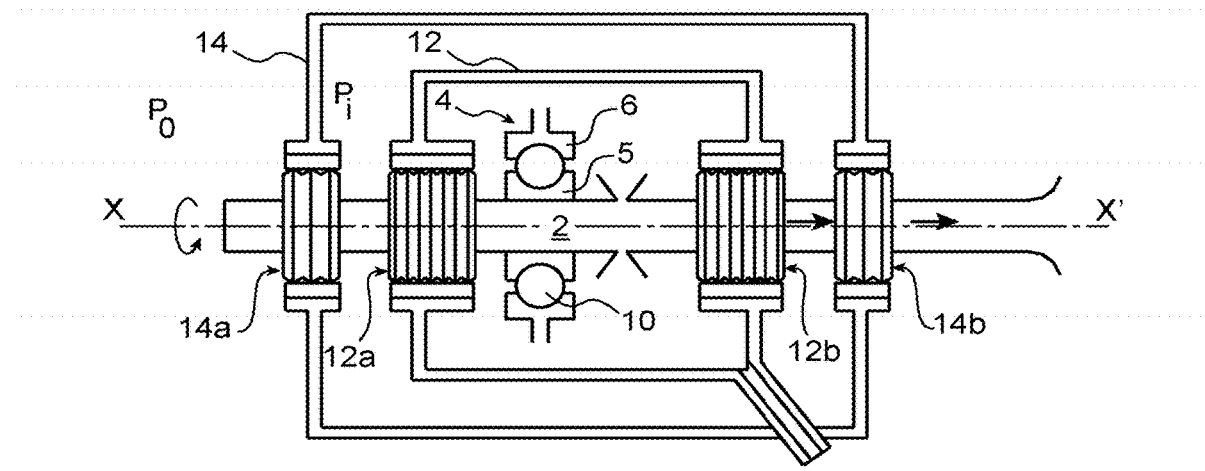
FIG. 1 very diagrammatically shows an example of a rotating shaft or rotor bearing enclosure.

This figure shows numerical references 2, 4-6, 10 that are identical to those of FIG. 1, they designates therein identical or similar elements. The reference 8 designates a fixed portion of the device to which the outer ring 6 is connected.

Moreover, the references 12a, 14a designate 2 seals, of which one (reference 12a) designates an air/oil seal and the other (reference 14a) designates an air/air seal. The first has a function of a seal of the first enclosure 12 (FIG. 1), while the second ensures the seal of the second enclosure 14 (FIG. 1. The reference 19 (FIG. 2A) designates a sleeve integral with the shaft 2, which itself rotates around the longitudinal axis XX'. The sleeve 19 is interposed between this shaft and the inner ring 5 of the bearing 4. The reference 20 designates the rotating surface with respect to which the seal forms the seal.

The second seal 14a is rather of the strip type, in contact with an abradable material.

For the first seal 12a, on utilise a seal of the brush seal type, of which the bristles are made of carbon.

Figure 2B:
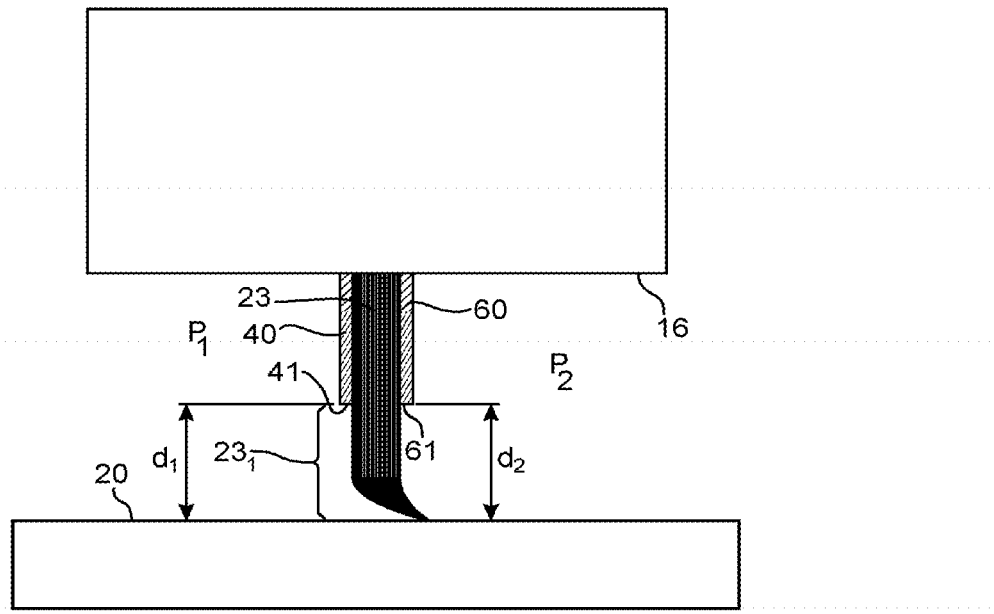
FIG. 2B shows a brush seal, held between a front ring and a rear ring.

FIG. 2B diagrammatically shows such a seal 12a and its system for holding. The seal is held by an envelope 16 and comprises a layer of bristles 23 of which the first end $23_1$, which is free, is intended to come into contact with the rotating surface 20, with respect to which it will make it possible to create a seal.

A portion of the bristles extends in a substantially rectilinear manner.

The second end of the bristles, opposite the end $23_1$, is surrounded by the envelope 16, connected in fact to the fixed portion 8 of the turbomachine. The form of this envelope can vary, in particular according to its integration with this fixed portion. Generally, the layer of bristles is held, in or on the envelope 16, by laminating, screwing, or gluing, or, generally, by mechanical means of holding.

The second end of the bristles is held by two end positions 40, 60 of an internal ring for holding bristles (not shown in this figure) which, as can be seen in FIG. 2B, is extended along the portion of the rectilinear portion of the bristles. These portions 40, 60 are designated, respectively, by the expressions "front ring" and "rear ring". With respect to the flow of air and to the pressure of the latter, "front" or "upstream" mean the portion of the flow that is of a higher pressure (P1) and "rear" or "downstream" mean the portion of the flow at a lower pressure (P2).

The seal is therefore held between the front ring 40 and the rear ring 60, with the expression "front ring clearance" designating the distance d1 between the surface 41 of the front ring which is the closest to the rotating surface 20. The rear ring clearance designates the distance d2 between the surface 61 of the rear ring which is the closest to the rotating surface 20.

Figure 3:
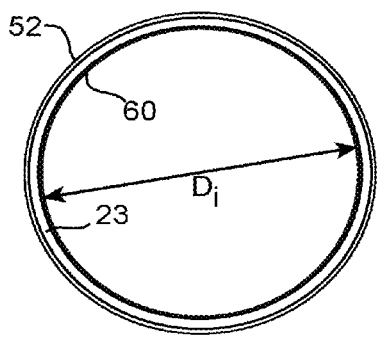
FIG. 3 shows a brush seal, seen from the front, held by a system of rings.
Figure 4:
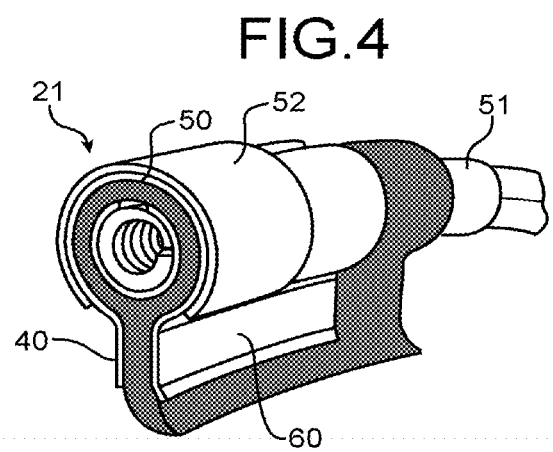
FIG. 4 shows a portion of a brush seal and means for fastening this seal, FIGS. 5A and 5B diagrammatically and respectively show, the air flow rates upstream and downstream of a brush seal (FIG. 5A) and the distribution of the forces on the layer of bristles of such a seal (FIG. 5B)

The FIGS. 3 and 4 show, respectively, a front view and a perspective view (partial) of an embodiment of such a seal and of its system for holding 21 in a circular configuration. The bristles 23 appear at the internal periphery of the system for holding 21 which comprises, in this example, the inner ring 50 for holding bristles and a ring 52 (or stamped sheet) for holding the inner ring. Typically, the value of the inner diameter $D_i$ of such an assembly is between 50 mm and 1000 mm. The outer diameter $D_e$ is substantially in the same range, with, of course $D_e > D_i$. FIG. 4 also shows a portion 51 referred to as internal core and whereon the layer of bristles is wound.

The performance of this type of seal has been tested.

Figure 5A:
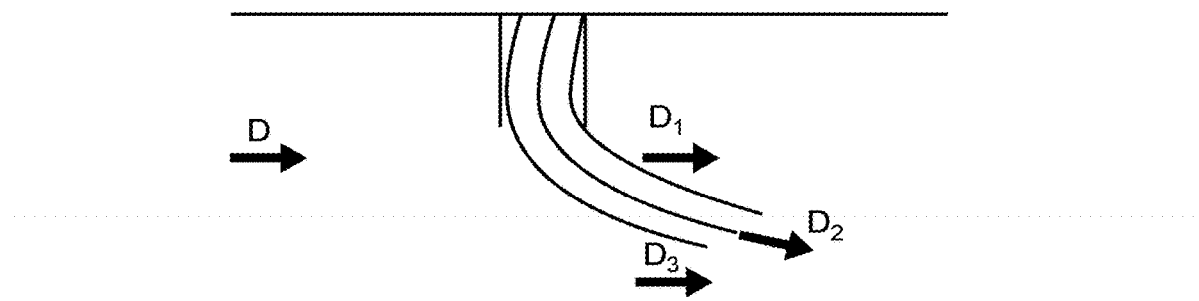
Figure 5B:
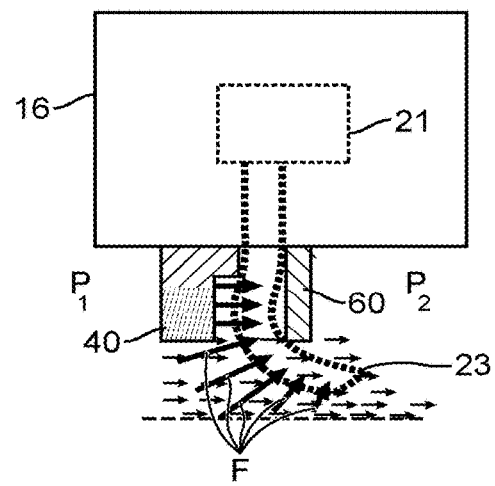

In particular, it has been able to be established, as shown FIG. 5A, that the air flow rate D that allows such a seal to pass is broken down into an air flow rate D1 that passes through the layer, an air flow rate D2 that passes in the bottom of the layer, and an air flow rate D3 that passes under the layer. FIG. 5B shows the corresponding distribution of the forces (arrows F) on the layer of bristles. It can be seen that the forces are applied on a major portion of the surface of the layer. In this figure, the envelope 16 allows for the assembly of the front 40 and rear 60 rings by any known means (for example by screwing), that comprises a system for holding 21 the bristles 23 of the layer.

Figure 6:
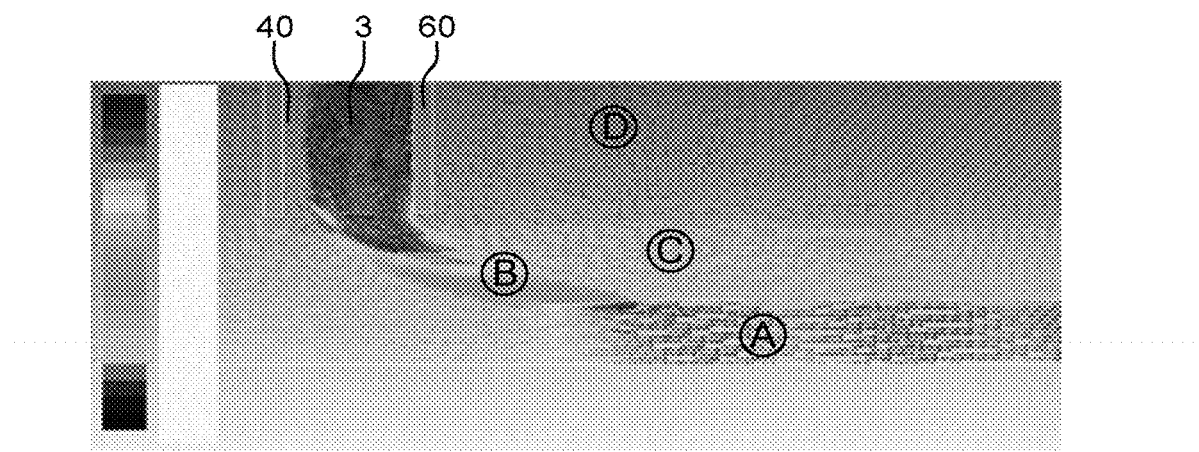
FIG. 6 shows a modelling of a flow of air with a seal held with a system of the type of that of FIG. 2B.

FIG. 6 shows, and still for the same type of seal, the result of a simulation of the flow of air in the compressible layer, in contact with the rotating surface, with the variation in pressure between the upstream pressure $P_1$ and the downstream pressure $P_2$ being 1.4 bars. The zones A, B are the zones where the speed of the air is the highest, while the zones C, D are zones where the speed of the air is not as high.

It is sought to reduce the leakage flow rate of such a seal.

Solutions consist in using for example a shield or implementing a gluing. But these solutions result in a reduction of the height of the layer, and therefore a stiffening of the latter. In turn, this stiffening increases the force of contact between the rotating surface 20 and the layer 3, which has for consequence an increase in the speed of wear and tear of the seal.

Figure 7A:
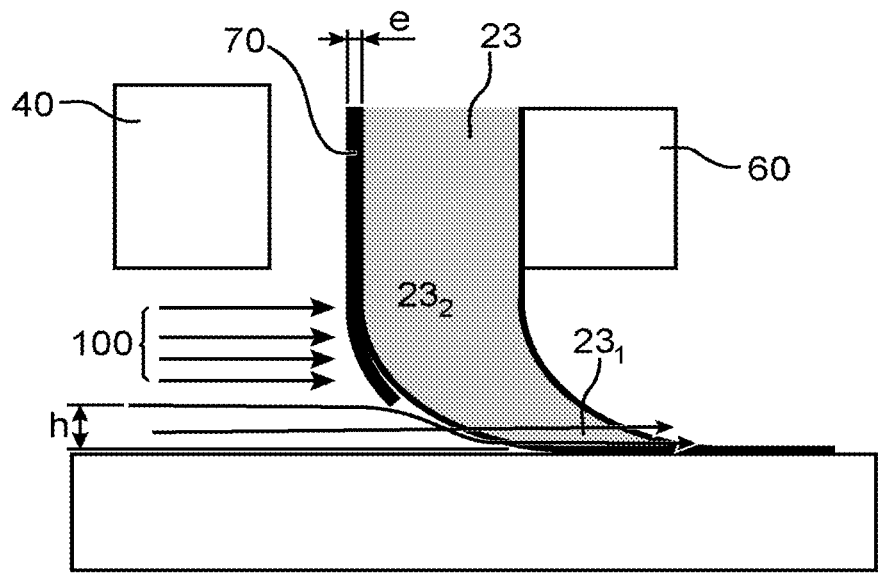
FIG. 7A shows a seal and its system for holding according to the invention as well as a diagram for the flow of the air through such a seal.

An embodiment of the invention, in order to overcome the problems hereinabove, and in particular the problem of reducing the leakage flow rate, is shown in FIG. 7A, wherein references identical to those of the preceding figures are found in order to designate the same elements or similar elements, in particular the layer 23 of bristles made of carbon, positioned between the front ring 40 and the rear ring 60 (with these elements having already been defined hereinabove).

As can be seen in this figure, the surface of the brush seal, which is turned towards the front ring 40, is provided with a flexible non-metal part 70, which makes it possible to stop the portion of the flow of air which would be directed, otherwise, towards the central portion $23_1$ of the layer. The part 70 therefore protects this central portion $23_2$ against the action of the flow of air. It is disposed between the layer 23 and the front ring 40, on the side where the pressure $P_1$ of the air is the strongest.

This part 70 is for example made of plastic material: indeed, this type of material is compatible with the temperatures encountered in the zone concerned of the enclosure 12; moreover it is compatible with the oils present in the enclosures and it is not able to cause defects in the bearings in case of degradation (low hardness). A material of the Kapton® or PTFE type can for example be used.

The flexibility properties of the part 70 allow the seal to retain its own flexibility, during its use. In particular, the thickness of this part 70 is low enough to bend with the layer 5 of the seal, during the operation of the assembly. The thickness e of the part 70 is therefore chosen to maintain the desired flexibility, while still guaranteeing a limitation, at the desired locations, of the air flow rate that flows through the seal. For this purpose, this thickness e can be between 0.01 and 1 mm, more preferably between 0.05 and 0.5 mm.

This part 70 makes it possible to limit the air flow rate to the lower portion 23₁ of the layer of bristles, close to the end portion intended to be in contact with the rotating surface. This lower portion 23₁ is therefore free from the protection that results from the presence of the part 70 in front of the part 23₂. The height h (see FIG. 7A) of this "free" part, measured in the direction of extension of the fibres of the layer, is for example between 0.1 mm and 2 mm.

As such, the air leakage flow rate through the seal is limited.

Figure 8:
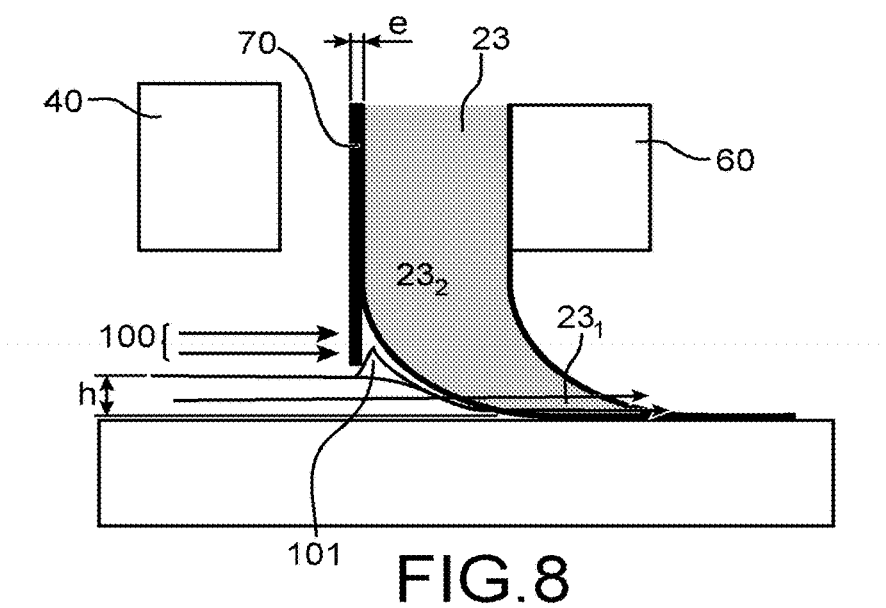
FIG. 8 shows a seal provided, downstream, with a non-flexible protective part.

FIG. 8 shows a situation wherein the part 70 is not flexible. In such a case, a vortex 101 is created between the end of this part which is not in contact with the layer of bristles 23 and the latter. Such an effect reduces the gain afforded by the flexibility in the case of a seal system according to the invention.

The part 70 can be fixed by different types of assembly, more preferably with a mechanical locking. But it is not fastened against the layer of bristles 3, for example by gluing.

Figure 7B:
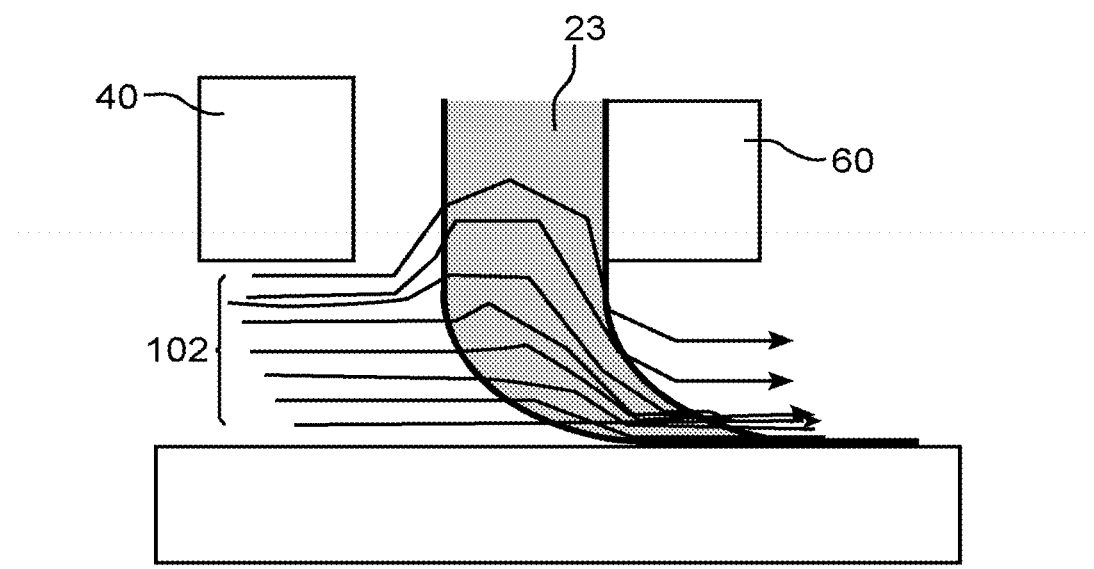
FIG. 7B shows a seal and son system for holding according to FIG. 2B as well as a diagram for the flow of the air through such a seal.

For the purposes of comparison, FIG. 7B shows a seal that has the constitution of FIG. 2B, with the flow of the corresponding flow of air 102. It can be seen that the latter passes through a major portion of the layer 23, and is developed radially (with respect to the axis XX') in the latter, in particular in the portion that is not passed through by the flow of air when the seal is equipped with the part or with the element 70, as described hereinabove and shown in liaison with FIG. 6A.

As already explained hereinabove, the presence of a brush seal according to the invention is compatible with the presence, upstream, of a seal 14a of the "laby" type (comprising one or several strips and one or more corresponding abradable surfaces).

This invention applies in particular to a rotating shaft or rotor bearing enclosure, such as explained hereinabove in liaison with FIG. 2A. But it can also be applied to a rectifier-compressor assembly by transposing, to a conventional brush seal, the high-performance brush seal according to the invention, with the end of the latter then being in contact with the shaft of a rotor and stopping a portion of the flow of air that flows through the seal in a direction substantially parallel to the axis of this rotor.

The invention claimed is:

1. A brush seal system, for application as an air/oil seal of a shaft bearing of a turbomachine, with an axis of rotation, the seal comprising:

a layer of carbon bristles, held between a first ring, disposed upstream of a flow of air that passes through the seal, and a second rear ring, disposed downstream of the flow of air, a surface of the layer of bristles, which is turned towards the first ring, including a non-metal flexible element that stops a portion of flow of air that flows through the seal in a direction substantially parallel to the axis of rotation, wherein a thickness of the flexible element is low enough to bend with the layer of bristles during operation of the turbomachine, wherein the thickness of the flexible element is between 0.05 mm and 0.5 mm, and wherein the flexible element leaves free an end portion of the layer of bristles having a length, measured in a direction of extension of the bristles of the layer, between 0.1 mm and 2 mm.

2. A brush seal system according to claim 1, wherein the flexible element is in a form of a crown made of plastic material, or of polyimide, or PTFE type.

3. A seal system according to claim 1, further comprising means for holding an end of the bristles of the layer, opposite an end to come into contact with a rotating surface.

4. A seal system as claimed in claim 1, further comprising an envelope that holds an end of the layer of bristles, opposite an end to come into contact with a rotating surface.

5. A seal system as claimed in claim 4, further comprising a third ring, internal to the envelope, that allows the first ring and the second ring to pass.

6. A seal system according to claim 1, having a circular configuration, in relation to the axis of rotation.

7. A seal system according to claim 1, wherein an end of the bristles of the brush seal is in a shape of a ring and is surrounded around a core with a substantially circular section.

8. An enclosure of a shaft bearing of a turbomachine comprising a seal system according to claim 1.

9. A turbomachine comprising an enclosure of a shaft bearing according to claim 8.

10. A brush seal system, for application as an air/oil seal of a shaft bearing of a turbomachine, with an axis of rotation, the seal comprising:

a layer of carbon bristles, held between a first ring, disposed upstream of a flow of air that passes through the seal, and a second rear ring, disposed downstream of the flow of air, a first surface of the layer of bristles, which is turned towards the first ring, including a non-metal flexible element that stops a portion of flow of air that flows through the seal in a direction substantially parallel to the axis of rotation, wherein a thickness of the flexible element is low enough to bend with the layer of bristles during operation of the turbomachine, and wherein a second surface of the layer of bristles, opposed to the first surface of the layer of bristles and which is turned towards the second ring, is exposed to the flow of air.

* * * * *